United States Patent
Huff et al.

(10) Patent No.: US 7,482,969 B2
(45) Date of Patent: Jan. 27, 2009

(54) MATERIAL MOVEMENT SENSING TECHNIQUES

(75) Inventors: Gregory Hilding Huff, College Station, TX (US); Jennifer T. Bernhard, Champaign, IL (US); Susan Hagness, Madison, WI (US); Debra Laefer, Dublin (IE)

(73) Assignee: Board of Trustees of the University of Illinois, Urbana, IL (US)

( * ) Notice: Subject to any disclaimer, the term of this patent is extended or adjusted under 35 U.S.C. 154(b) by 98 days.

(21) Appl. No.: 11/453,259

(22) Filed: Jun. 14, 2006

(65) Prior Publication Data
US 2007/0290917 A1    Dec. 20, 2007

(51) Int. Cl.
*G01S 13/89* (2006.01)
*G01S 13/88* (2006.01)

(52) U.S. Cl. .................. 342/22; 324/332; 324/337; 342/5; 342/118; 342/179

(58) Field of Classification Search .............. 342/22, 342/90, 17, 191, 5–12, 179; 455/40; 324/332, 324/337
See application file for complete search history.

(56) References Cited

U.S. PATENT DOCUMENTS

| 3,320,614 | A | * | 5/1967 | Jedrey, Jr. ............... 342/188 |
| 3,623,091 | A | | 11/1971 | Mayo, Jr. et al. |
| 4,184,155 | A | | 1/1980 | Sivertson Jr. |
| 5,179,382 | A | | 1/1993 | Decker |
| 5,248,975 | A | * | 9/1993 | Schutz .................... 342/21 |
| 5,426,667 | A | | 6/1995 | van Zon |
| 5,508,704 | A | | 4/1996 | Hann |
| 5,614,831 | A | | 3/1997 | Edvardsson |
| 5,680,136 | A | | 10/1997 | Chekroun |

(Continued)

FOREIGN PATENT DOCUMENTS

DK    3690039 T    *    1/1987

(Continued)

OTHER PUBLICATIONS

Intruduction to Radar Systems p. 7 Skolnik, Merrill L. McGraw-Hill, Inc. 1980 ISBN 0-07-057909-1.*

(Continued)

*Primary Examiner*—Thomas H Tarcza
*Assistant Examiner*—Cassi Galt
(74) *Attorney, Agent, or Firm*—Krieg DeVault LLP; L. Scott Paynter

(57) ABSTRACT

One embodiment of the present invention provides several electromagnetic radiation reflectors within a volume that contains solid portions subject to movement relative to one another. At least a portion of the reflectors are positioned beneath one or more of the solid portions and move in response to movement of at least some of the solid portions. The volume is irradiated with electromagnetic radiation having one or more frequencies in a range from one kHz through one THz, and a reflection is detected of at least a portion of the electromagnetic radiation from each of the reflectors in response to this irradiation. Movement among the solid objects is evaluated from the reflection of each of the reflectors, which includes determining a spatial orientation of each one of the reflectors as a function of at least one of polarization selectivity and frequency selectivity.

27 Claims, 3 Drawing Sheets

U.S. PATENT DOCUMENTS

| | | | |
|---|---|---|---|
| 5,741,979 A | 4/1998 | Arndt et al. | |
| 5,904,210 A * | 5/1999 | Stump et al. | 175/45 |
| 6,282,026 B1 | 8/2001 | Dreyer et al. | |
| 6,583,751 B1 * | 6/2003 | Ferretti et al. | 342/25 R |
| 6,778,128 B2 * | 8/2004 | Tucker et al. | 342/22 |
| 6,813,324 B1 * | 11/2004 | Yewen | 375/354 |
| 6,877,866 B2 | 4/2005 | Nilsen et al. | |
| 6,883,921 B2 | 4/2005 | Mimura et al. | |
| 6,894,615 B2 | 5/2005 | Look | |
| 6,950,021 B2 | 9/2005 | Butler | |
| 2003/0095186 A1 * | 5/2003 | Aman et al. | 348/162 |
| 2004/0068204 A1 * | 4/2004 | Imran et al. | 600/593 |
| 2007/0109177 A1 * | 5/2007 | Baath et al. | 342/124 |
| 2007/0225595 A1 * | 9/2007 | Malackowski et al. | 600/424 |

FOREIGN PATENT DOCUMENTS

| | | | |
|---|---|---|---|
| JP | 06130077 A * | 5/1994 | |
| WO | WO94/18578 | 8/1994 | |
| WO | WO2005/057142 A1 | 6/2005 | |

OTHER PUBLICATIONS

D.P. Landau, K.k. Mon., and H.-B. Schuttler, Computer Simulation Studies in Condensed-Matter Physics X, Proceedings of the Tenth Workshop, Athens, GA, USA, Feb. 24-28, 1997.

Shin, J., et al., Observing Method of Movement Phenomenon of Earth and Rocks, a machine translation of Patent No. JP 406130077A; copyright 1994.

* cited by examiner

MATERIAL MOVEMENT SENSING TECHNIQUES

BACKGROUND

The present invention relates to sensing techniques, and more particularly, but not exclusively, relates to sensing movement of material with embedded electromagnetic radiation reflectors.

There is an interest in observing movement characteristics of granular materials and other material including solids. Accurate observation of slow-changing movement patterns in volumes with a high density of solids can be particularly challenging. In some instances, it is desirable to provide an image representative of an interior view of such volumes. Unfortunately, current capabilities remain limited. Thus, an ongoing demand exists for further contributions in this area of technology.

SUMMARY

One embodiment of the present invention includes a unique sensing technique. Other embodiments include unique apparatus, devices, systems, and methods to sense, evaluate, and/or image movement. Further embodiments, forms, objects, features, advantages, aspects, and benefits of the present application shall become apparent from the detailed description and figures included herewith.

DETAILED DESCRIPTION OF REPRESENTATIVE EMBODIMENTS

Figure 1:
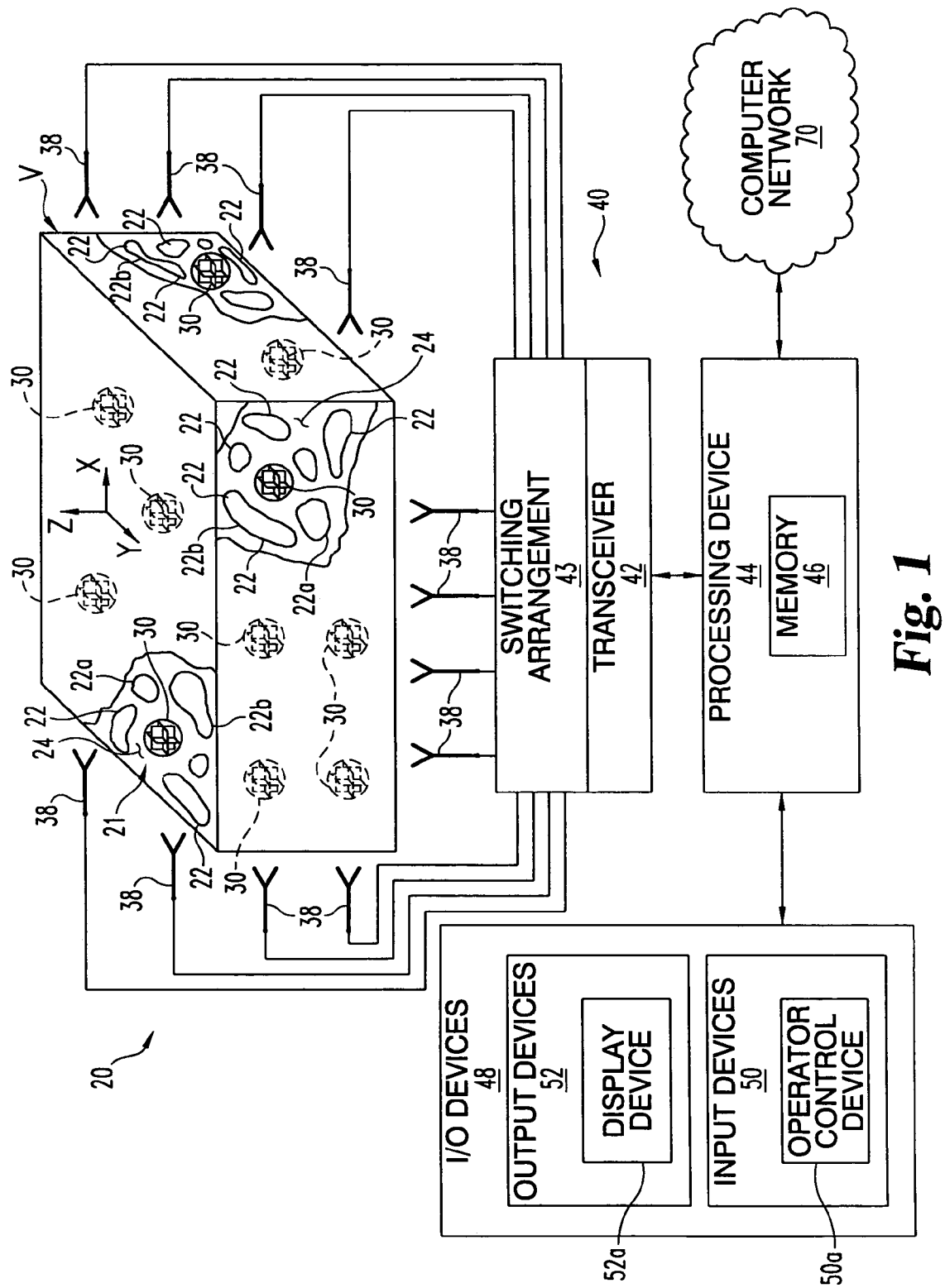
FIG. 1 is a diagrammatic view of a system with a partial cutaway view of an interrogated volume.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present invention is directed to a technique for monitoring movement of solids within a given volume. Several markers are embedded among the solids and each marker reflects electromagnetic radiation at one or more frequencies in a spectral range from one kiloHertz (kHz) through one TeraHertz (THz). The reflection from each of the markers is selective to one or more electromagnetic radiation characteristics. This selectivity can be used to determine a change in rotational and/or translational position of a given marker. Marker position is evaluated to determine what, if any, movement of the solids has occurred. In one form, changing position of the markers is tracked over time. Alternatively or additionally, one or more images are generated from marker reflection data that each represent an internal view of the volume at a specific moment in time.

FIG. 1 depicts system 20 of another embodiment of the present invention. System 20 is directed to monitoring movement of solid portions of a material that are subject to displacement relative to one another. Such monitoring includes the interrogation of one or more markers embedded among the portions. These markers are each responsive to interrogation by electromagnetic radiation to provide a corresponding reflection at one or more frequencies within a range from one kiloHertz (kHz) through one TeraHertz (THz). This spectral range corresponds to wavelengths of several kilometers at the low frequency extreme to micrometers at the high frequency extreme. The markers may be hidden from view beneath the material. Reflected electromagnetic radiation from the markers is detected to track positional change over time. System 20 also generates images representative of an internal view of the material from the marker reflection data.

System 20 includes volume V in the approximate form of a parallelpiped, shown in a perspective view relative to three mutually perpendicular axes x, y, and z. Resident within volume V is material 21, which is comprised of one or more separate solid pieces. The composition of material 21 may be heterogeneous or homogenous. Material 21 is further depicted as a number of solid portions 22. One or more of portions 22 are subject to movement relative to one or more other portions 22. In various embodiments, portions 22 can correspond to granular materials, such as agricultural grain, sand, powder, or the like; civil infrastructure subject to deformation and/or fracture, such as a roadway, tunnel wall, concrete column, or the like; soil; fluvial deposits; geologic strata; landfill material, and/or solids in a material flow that may or may not include liquid—just to name a few representative examples. Generally, for any two portions 22 that move relative to one another, such two portions 22 may be separate objects 22a or may be integrally connected together in a single object 22b with the relative motion resulting from deformation (plastic or elastic) of this single object 22b. Furthermore, it should be understood that two or more of portions 22 can break apart to provide more portions 22 and/or join together to provide fewer portions 22, as appropriate for the arrangement of material 21, its surroundings, and environment. Also, the number of portions 22 can change with time under certain circumstances due to dissolution, sublimation, or the like.

Within volume V, a number of schematically illustrated markers 30 are dispersed among portions 22. In the cutaway view of volume V, markers 30 are schematically shown in solid line form, and are shown in phantom elsewhere. It should be understood that markers 30 are each covered by one or more of portions 22—such that markers 30 are buried within the interior 24 of volume V. Correspondingly, markers 30 are hidden from view by human eyesight of an observer external to volume V. Markers 30 are each sized, shaped, and otherwise structured to be embedded in portions 22 within volume V and to be responsive to motion of portions 22.

Figure 2:
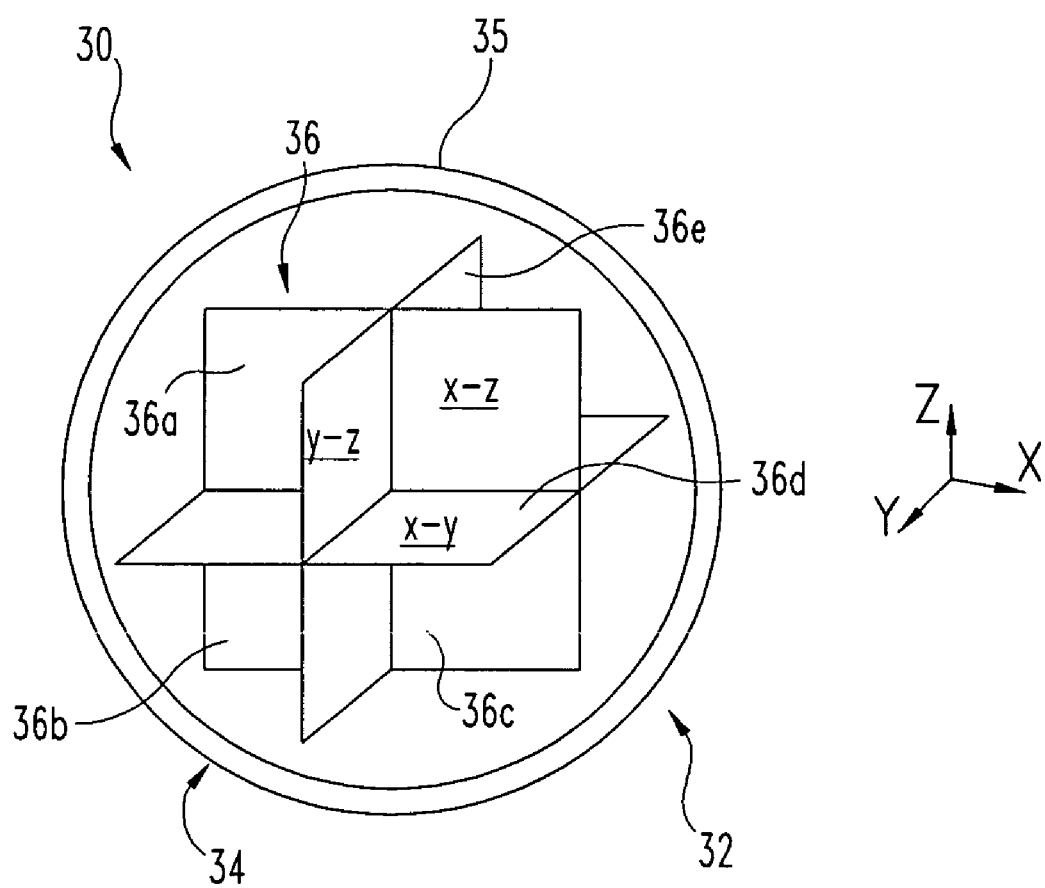
FIG. 2 is a view of a passive retroflector included in the system of FIG. 1.

Referring additionally to FIG. 2, markers 30 are each provided in the form of a reflector 32 that reflects one or more frequencies of electromagnetic radiation in the one kHz through one THz range. In a more specific form, this range is from one MHz through one 100 GHz. In an even more specific form, this range is from 100 MHz through 10 GHz. Markers 30 are each passive, lacking a power source. Even more specific, markers 30 are each in the form of a passive retroreflector 34 that redirects at least a portion of such electromagnetic radiation incident to retroreflector 34 back towards its origin. Markers 30 each provide a reflection that is unique in one or more respects from the other markers 30. This unique reflection is used to distinguish between different markers 30 and the corresponding marker positions. In one form, this uniqueness is provided by a different selectivity to electromagnetic radiation frequency for each marker 30. Alternatively or additionally, polarization selectivity can be used to provide different reflection characteristics to distinguish between markers 30. In other embodiments, different reflection characteristics/properties can be used to distinguish markers 30 in addition or in the alternative.

Retroreflector 34 is structured to provide several retroreflecting sections 36 and includes a protective enclosure 35. For the depicted embodiment, eight retroreflecting sections 36 are included in retroreflector 34, a few of which are more specifically designated by reference numerals 36a, 36b, 36c, 36d, and 36e. In other embodiments, more or fewer retroreflecting sections may be included, the sections may be differently shaped or configured, and/or enclosure 35 may be absent.

Sections 36 each provide a reflection with at least one property that is unique relative to the other sections 36. This variation in reflection property may be provided as discrete distinctions from one section 36 to the next, or provide a generally continuous variation. In one form, retrodirective reflection of each section 36 varies with frequency, being selective to one or more frequencies or frequency bands relative to others. Alternatively or additionally, polarization of the electromagnetic radiation retroreflection of each section 36 varies to provide a reflection property that differs among sections 36. In further embodiments, other properties can be used to provide a rotation-dependent reflection in addition or in the alternative to any of those previously described. As a result, one or more reflection properties of marker 30 vary with the section(s) 36 struck by the incident electromagnetic radiation. In one particular arrangement, marker 30 is divided into eight approximately equally sized retroreflective cubic structures that each correspond to a cube defined by the intersection of three mutually orthogonal planes. These planes are illustrated as x-y, x-z, and y-z planes in the nonlimiting example of FIG. 2.

System 20 further includes antennas 38 arranged about volume V to perform electromagnetic radiation interrogation, and processing equipment 40. Antennas 38 are operatively coupled to equipment 40 and controlled by equipment 40. Antennas 38 could be provided as separate units and/or in the form of one or more arrays each with multiple antennas fixed in relation to one another. Furthermore, it should be appreciated that more or fewer antennas 38 may be utilized than shown in FIG. 1. Each antenna 38 is operable to transmit and receive electromagnetic radiation within a selected bandwidth; however, in other arrangements certain antennas 38 can be dedicated to transmission and/or reception. Equipment 40 includes transceiver 42 with controllable switching arrangement 43 coupled to antennas 38. Under the control of transceiver 42, individual antennas 38 can be selectively activated with switching arrangement 43 to operate in a transmit or receive mode. In a preferred embodiment, transceiver 42 and antennas 38 are of a form suitable to transmit and receive electromagnetic radiation at one or more frequencies selected from the range of one kiloHertz (kHz) through one Terahertz (1 kHz through 1 THz). In a more preferred embodiment, this range is from one MHz through 100 GHz. In an even more preferred embodiment, this range is from 100 MHz through 10 GHz. In still other embodiments, the particular range is selected based on the electrical and/or magnetic properties of the material present in a given application and the degree of resolution desired for the interrogation as more fully described hereinafter.

Transceiver 42 includes operating logic to control operation of antennas 38 in transmit and receive modes as appropriate, and output resulting information in a form compatible with processing of this information. Specifically, transceiver 42 provides data corresponding to the antenna signals to processing device 44 of equipment 40. Device 44 includes memory 46. Transceiver 42 is responsive to signals from device 44 to direct transmission and reception operating modes of antennas 38.

Device 44 can be comprised of one or more components of any type suitable to process the signals received from transceiver 42 or elsewhere, across memory 46, and provide desired output signals. Such components may include digital circuitry, analog circuitry, or a combination of both. Device 44 can be of a programmable type; a dedicated, hardwired state machine; or a combination of these. Device 44 can further include multiple processors, Arithmetic-Logic Units (ALUs), Central Processing Units (CPUs), or the like. For forms of device 44 with multiple processing units, distributed, pipelined, and/or parallel processing can be utilized as appropriate. Device 44 can include signal conditioners, signal format converters (such as analog-to-digital and digital-to-analog converters), limiters, clamps, filters, power supplies, power converters, and the like as needed to perform various control and regulation operations described herein. Device 44 may be dedicated to performance of just the operations described herein or may be utilized in one or more additional applications. In one form, device 44 is of the programmable variety that executes algorithms and processes data in accordance with operating logic that is defined by programming instructions (such as software or firmware). Alternatively or additionally, operating logic for device 44 is at least partially defined by hardwired logic or other hardware.

Memory 46 can be of a solid-state variety, electromagnetic variety, optical variety, or a combination of these forms. Furthermore, memory 46 and can be volatile, nonvolatile, or a mixture of these types. Furthermore, some or all of memory 46 can be of a portable type, such as a disk, tape, memory stick, cartridge, or the like. Memory 46 can be at least partially integrated with processor(s) 44. In one form, memory 46 stores programming instructions executed by device 44 to embody at least a portion of this operating logic. Alternatively or additionally, memory 46 stores data that is manipulated by the operating logic of device 44, such as data representative of signals received from transceiver 42, just to name one example.

Equipment 40 includes Input/Output (I/O) devices 48. Devices 48 include one or more operator input devices 50 and one or more operator output devices 52. Operator input devices 50 include an operator processing control device 50a that can be a keyboard, mouse or other pointing device, a voice recognition input subsystem, and/or different operator input apparatus as would occur to those skilled in the art. Operator output devices 52 include an operator display device 52a that can be of a Cathode Ray Tube (CRT) type, Liquid Crystal Display (LCD) type, plasma type, Organic Light Emitting Diode (OLED) type, a printer, or such different type as would occur to those skilled in the art. Other I/O device(s) can be included such as loudspeakers, electronic wired or wireless communication subsystems, and the like. In FIG. 1, one further I/O arrangement of equipment 40 interfaces with a separately depicted computer network 70. Computer network 70 can be provided in the form of one or more dedicated communication channels for equipment 40, a Local Area Network (LAN), Municipal Area Network (MAN), and/or a Wide Area Network (WAN), such as the internet. Communications over network 70 can be used to disseminate processed data results, to receive programming updates, and/or to provide remote access to equipment 40.

Figure 3:
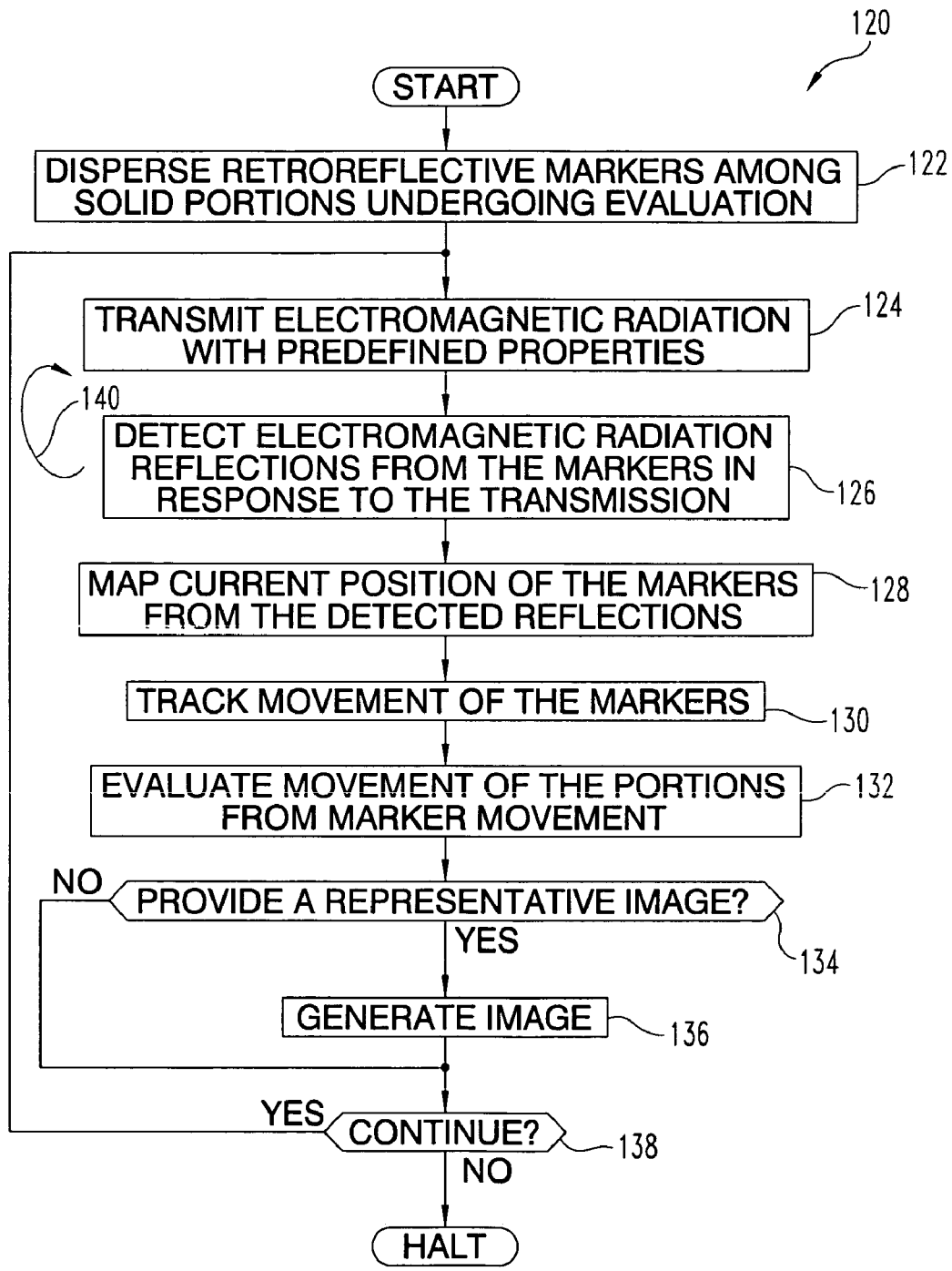
FIG. 3 is a flowchart of a procedure that can be implemented with the system of FIG. 1.

FIG. 3 depicts movement evaluation procedure 120 in flowchart form. Procedure 120 can be implemented with system 20 through execution of corresponding operating logic by equipment 40. Procedure 120 starts with operation 122 in which markers 30 are interdispersed among the solid portions 22 in volume V. As previously described, markers 30 are hidden by portions 22 and are structured to move therewith. After placement, markers 30 are interrogated with electromagnetic radiation from antennas 38 in operation 124. In response, electromagnetic radiation reflections from markers 30 are detected in operation 126. From the detected reflections in operation 126, the position of each marker 30 is mapped relative to the others in operation 128.

In one form, the interrogation of volume V in operation 124 is performed by activating the transmit mode of each of the antennas 38 placed about volume V in a predefined sequence and then detecting the reflection response of each marker 30 in operation 126 for analysis. For this form, the transmit mode operation of antenna 38 provides an electromagnetic radiation transmission that sweeps over a desired frequency range and the markers 30 struck by this incident radiation each generate a reflection selective to a different frequency band within this range to distinguish among them. For this frequency selective approach, the data gathered with multiple, spaced-apart antennas 38 can be used to generate marker position information. Alternatively or additionally, different polarization selectivities among markers 30, time-of-flight impulse interrogation, and/or other techniques can be used to provide positional data for markers 30. The position of each of the markers 30 relative to one another can be mapped from this positional data in correspondence to operation 128.

In addition to determining the relative displacement of markers 30 from one another, the movement of solid portions 22 can result in a change in rotational orientation of one or more of markers 30 without necessarily changing displacement relative to any other of the markers 30. Given the origin of incident electromagnetic radiation used to interrogate marker 30, the reflection property variation among sections 36 can be used to determine whether a change has occurred in rotational orientation of a given marker 30. In one form, the application of frequency band selectivity to distinguish among different markers 30 is complemented by the use of selectivity to different frequencies among sections 36 that are within the frequency band for the given marker 30. In a further variation, polarization selectivity of sections 36 can be used to determine rotational change with or without frequency selectivity among the different sections 36 of the corresponding marker 30. Any detected change in rotational orientation can be expressed as a quantity of rotation about one or more axes. It should be appreciated that the attendant resolution of a detectable change in rotational orientation depends on a number of factors such as section 36 quantity, size, and geometric arrangement.

After mapping in operation 128, procedure 120 continues with operation 130. Operation 130 tracks translational and rotational movement of markers 30 within volume V. From marker movement, operation 132 evaluates movement among portions 22 of material 21. Operation 132 can include the characterization of the material with vector fields representative of material movement. From these vector fields, operation 132 can include the characterization of material flow paths within volume V, mechanical stress regions that result from differential movement, or the like.

From operation 132, procedure 120 continues with conditional 134. Conditional 134 tests whether to provide one or more images representative of the material 21 and/or markers 30 interior to volume V that may be hidden from view external to volume V. If the test of conditional 134 is true (yes), then procedures 120 advances to operation 136, to generate the one or more images. Typically, these images are output with display device 52a, and are of a two-dimensional, sectional nature; however, other types of visual representations can be additionally or alternatively generated.

Returning to FIG. 3, if the test of conditional 134 is negative (no) or operation 136 has been completed, procedure 120 then continues with conditional 138. Conditional 138 tests whether to continue performance of procedure 120 or to halt. If the test of conditional 138 is true (yes), procedure 120 loops back to operation 124 via procedure loop 140. The repeated electromagnetic radiation interrogation (operation 124), reflection detection (operation 126), and marker mapping (operation 128) is used to update marker tracking (operation 130) and correspondingly further evaluate movement of material 21 within volume V (operation 132). The option of image generation is then encountered again (conditional 134 and operation 136) before returning to conditional 138 to once more determine whether to continue.

Many other embodiments of the present invention are also envisioned. For example, as an alternative to an array of antennas, a single antenna could be utilized that is moved about the volume along a predefined route with a frequency sweep transmitted at different predefined positions along the route. In another embodiment, rotational orientation is not determined, only the relative placement of markers among the solids. Additionally or alternatively, the desired degree of transparency of the material to the selected wavelength(s)/ frequency(ies) of the interrogating radiation may be taken into account and/or the wavelength(s)/frequency(ies) of the interrogating radiation may be adjustable for different applications having different magnetic or electrical properties.

Yet another exemplary embodiment includes dispersing several electromagnetic radiation markers within a volume that includes several solid objects. At least a portion of the markers are buried beneath at least a portion of these solid objects. The volume is interrogated with electromagnetic radiation having one or more frequencies in a range from one kHz through one THz. Returned electromagnetic radiation from each of the markers is detected in response to this interrogation and movement among the solid objects is evaluated from the returned electromagnetic radiation. This evaluation can include determining a change in rotational orientation of one or more of the markers based on a reflection property that varies with marker orientation.

Still another embodiment includes several electromagnetic radiation markers within a volume that contains several solid portions of a material. At least a portion of these markers are hidden from view external to the volume by the material. This embodiment further includes means for interrogating the volume with electromagnetic radiation having one or more frequencies in a range between one kHz and one THz, means for detecting returned electromagnetic radiation from each of the markers in response to the interrogating means, and means for evaluating movement from the returned electromagnetic radiation of each of the markers. This evaluating means further includes means for determining a change in rotational orientation of one or more of the markers as a function of one or more properties of the returned electromagnetic radiation that varies with the rotational orientation.

Yet another embodiment includes: providing several electromagnetic radiation reflectors within a volume, operating one or more antennas to perform an electromagnetic radiation interrogation of the volume, and generating an image representative of an interior of the volume as a function of the electromagnetic radiation reflected by each of the reflectors in response to the interrogation. The volume may include solid portions subject to movement relative to one another with at least a portion of the reflectors being hidden from view external to the volume. In one form, the reflected electromagnetic radiation is in a frequency range of one kHz through one THz. In a more preferred form, the frequency range is from about one MHz through 100 GHz. In an even more preferred embodiment, the frequency range is from about 100 MHz through about 10 GHz.

A further embodiment includes several electromagnetic radiation reflectors within a volume that has solid portions subject to movement relative to one another. At least a portion of these reflectors are hidden from view external to the volume by one or more of the solid portions and are moveable in response to movement of at least some of the solid portions. This embodiment further includes the means for operating one or more antennas to perform an electromagnetic radiation interrogation of the volume and means for generating an image representative of an interior of the volume as a function of the electromagnetic radiation reflected by each of the reflectors.

In a different embodiment, several reflectors are structured for dispersal in a volume among a number of solid objects subject to movement relative to one another, and at least a portion of the reflectors are buried beneath at least a portion of the solid objects. This embodiment further includes one or more antennas operable to irradiate the volume with electromagnetic radiation in a frequency range of one kHz through one THz, and detect reflection of at least a portion of the electromagnetic radiation. Also included is a processing device responsive to detection of the reflection to evaluate movement of the solid objects based on at least one of polarization selectivity and frequency selectivity of the reflection.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   dispersing several electromagnetic radiation markers within a volume, the volume including several solid objects, at least a portion of the markers being buried beneath at least a portion of the solid objects;
   interrogating the volume with electromagnetic radiation, the electromagnetic radiation being in a frequency range of one kHz through one THz;
   detecting returned electromagnetic radiation from each of the markers in response to the interrogating; and
   evaluating movement among the solid objects from the returned electromagnetic radiation of each of the markers, which includes determining a change in rotational orientation of one of the markers based on selectivity of the one of the markers to one or more properties of the electromagnetic radiation that varies with the rotational orientation of the one of the markers.

2. The method of claim 1, further comprising distinguishing between the markers based on at least one of polarization selectivity and frequency selectivity of each of the markers.

3. The method of claim 1, wherein the several solid objects comprise at least one of soil, grain, sand, geologic strata, and portions of a roadway.

4. The method of claim 1, wherein the markers each include a passive retroreflector and the returned electromagnetic radiation is reflected by each of the markers in the frequency range of one MHz through 100 GHz.

5. The method of claim 1, wherein the one or more properties include one or more of frequency and polarization, and which includes determining a rotational orientation change of each of several of the markers based on the one or more properties.

6. The method of claim 1, wherein the evaluating includes generating one or more images as a function of the returned electromagnetic radiation of each of the markers.

7. The method of claim 1, wherein the frequency range is from 100 MHz through 10 GHz.

8. A method, comprising:
   providing several electromagnetic radiation reflectors within a volume, the volume including solid portions subject to movement relative to one another, at least a portion of the reflectors being hidden from view external to the volume by one or more of the solid portions and moving in response to movement of at least some of the solid portions;
   operating one or more antennas to perform an electromagnetic radiation interrogation of the volume; and
   from the interrogation, generating an image representative of an interior of the volume as a function of electromagnetic radiation reflected by each of the reflectors, the electromagnetic radiation being in a frequency range of one kHz through one THz.

9. The method of claim 8, wherein the frequency range is from 1 MHZ through about 100 GHz.

10. The method of claim 8, which includes distinguishing between the reflectors based on at least one of polarization selectivity and frequency selectivity among the reflectors.

11. The method of claim 8, wherein the solid portions comprise at least one of a roadway, soil, and geologic strata.

12. The method of claim 8, including detecting a change in position of one or more of the solid portions from the electromagnetic energy reflected by the reflectors.

13. The method of claim 8, including evaluating flow of the solid portions with the image.

14. The method of claim 8, wherein the frequency range is 100 MHz through 10 GHz.

15. The method of claim 8, which includes detecting a change in rotational orientation of one or more of the reflectors based on at least one of polarization selectivity and frequency selectivity.

16. An apparatus, comprising:
several reflectors structured for dispersal in a volume among a number of solid objects subject to movement relative to one another, at least a portion of the reflectors being buried beneath at least a portion of the solid objects;
one or more antennas operable to irradiate the volume with electromagnetic radiation having one or more frequencies in a range of one kHz through one THz and detect reflection of at least a portion of the electromagnetic radiation from each of the reflectors; and
a processing device responsive to detection of the reflection from each of the reflectors to evaluate movement of the solid objects based on at least one of polarization selectivity and frequency selectivity of the reflection for each one of the reflectors.

17. The apparatus of claim 16, wherein the processing device is further operable to generate one or more output signals representative of an image of an interior of the volume; and further comprising a display device responsive to the one or more output signals to display the image.

18. The apparatus of claim 16, wherein the reflectors are each of a retroreflector type and the frequency range is from 1 MHz through 100 GHz.

19. The apparatus of claim 16, wherein the frequency range is 100 MHz through 10 GHz, and the one or more antennas number more than two and are operable to irradiate the volume with electromagnetic energy in the frequency range and detect the reflected electromagnetic energy in accordance with a predefined sequence.

20. The apparatus of claim 16, wherein the processing device includes:
means for distinguishing between the two or more reflectors based on one or more of the polarization selectively and the frequency selectivity; and
means for determining a change in rotational orientation of at least one of the two or more reflectors based on one or more of the polarization selectivity and the frequency selectivity.

21. A method, comprising:
providing several electromagnetic radiation reflectors within a volume, the volume including solid portions subject to movement relative to one another, at least a portion of the reflectors being positioned beneath one or more of the solid portions and moving in response to movement of at least some of the solid portions;
irradiating the volume with electromagnetic radiation, the electromagnetic radiation having one or more frequencies in a range of one kHz through one THz;
detecting a reflection of at least a portion of the electromagnetic radiation from each of the reflectors in response to the irradiating; and
evaluating movement among the solid portions from the reflection of each of the reflectors which includes determining a spatial orientation of each one of the reflectors as a function of at least one of polarization selectivity and frequency selectivity.

22. The method of claim 21, wherein the determining of the spatial orientation includes determining rotational position of each one of the reflectors based on a difference in one or more of the polarization of the reflection and the frequency of the reflection that depends on the rotational position.

23. The method of claim 21, wherein the determining of the spatial orientation includes distinguishing between the reflectors based on one or more of the polarization selectivity and the frequency selectivity that differs among the reflectors.

24. The method of claim 21, wherein the reflectors are each of a retroreflector type and the frequency range is from 1 MHz through 100 GHz.

25. The method of claim 21, which includes generating an image representative of the volume from the spatial orientation of each one of the reflectors.

26. The method of claim 21, wherein the solid portions comprise at least one of a roadway, soil, and geologic strata.

27. The method of claim 21, wherein the evaluating includes detecting a change in position of one or more of the solid portions from the reflection of each of the reflectors.

* * * * *